US007575217B2

(12) United States Patent
Jucha et al.

(10) Patent No.: US 7,575,217 B2
(45) **Date of Patent: *Aug. 18, 2009**

(54) INSERT APPARATUS FOR A MOLD, METHOD OF MANUFACTURING A STRUCTURAL UNIT, METHOD OF RETROFITTING AN EXISTING MOLD AND A STRUCTURAL UNIT

(75) Inventors: Richard R. Jucha, Moon Township, PA (US); Donald L. Lampus, Pittsburgh, PA (US)

(73) Assignee: R. I. Lampus Company, Springdale, PA (US)

( * ) Notice: Subject to any disclaimer, the term of this patent is extended or adjusted under 35 U.S.C. 154(b) by 663 days.

This patent is subject to a terminal disclaimer.

(21) Appl. No.: 11/053,034

(22) Filed: Feb. 8, 2005

(65) Prior Publication Data

US 2005/0183360 A1 Aug. 25, 2005

(51) Int. Cl.
*A23G 9/00* (2006.01)
*B28B 7/06* (2006.01)
*F25C 1/24* (2006.01)

(52) U.S. Cl. ...................... 249/130; 249/103; 249/119; 249/125; 249/203

(58) Field of Classification Search ......... 249/102-104, 249/131, 160, 119, 130, 125; 425/186
See application file for complete search history.

(56) References Cited

U.S. PATENT DOCUMENTS

| | | | |
|---|---|---|---|
| 754,550 | A | 3/1904 | Dunn |
| 760,678 | A | 5/1904 | Burnham |
| 0,769,771 | A | 9/1904 | Seamans |
| 789,996 | A | 5/1905 | McCullough |
| 0,848,697 | A | 4/1907 | Silva et al. |
| 952,702 | A | 3/1910 | Getman |
| 962,104 | A | 6/1910 | Smith |
| 1,166,312 | A | 12/1915 | Barten |
| 1,219,127 | A | 3/1917 | Marshall |
| 1,458,551 | A | 6/1923 | Seat |
| 1,635,093 | A | 7/1927 | McPherson et al. |
| 1,685,188 | A | 9/1928 | Beckwith |
| 1,693,693 | A | 12/1928 | Dexter |
| 1,911,539 | A | 5/1933 | Walter |
| 2,355,967 | A | 8/1944 | Greenwalt |
| 2,440,582 | A | 4/1948 | Green |
| 2,532,049 | A | 11/1950 | Wittke |

(Continued)

FOREIGN PATENT DOCUMENTS

| | | |
|---|---|---|
| DE | 182019 C | 3/1906 |

(Continued)

*Primary Examiner*—Richard E Chilcot, Jr.
*Assistant Examiner*—Chi Q Nguyen
(74) *Attorney, Agent, or Firm*—The Webb Law Firm

(57) ABSTRACT

Disclosed is an insert apparatus for a mold for manufacturing structural units. The insert apparatus includes a carrier for operatively engaging a portion of the mold, and is in communication with a face or an object having an engagement design portion thereon. The face is in operative communication with the carrier, and the engagement design portion extends into or out of the cavity of the mold. Methods of manufacturing such a structural unit, methods of retrofitting an existing mold for manufacturing such a unit and novel and improved structural units are also disclosed.

10 Claims, 3 Drawing Sheets

U.S. PATENT DOCUMENTS

| | | | | |
|---|---|---|---|---|
| 2,874,442 | A | 2/1959 | Henderson | |
| 3,734,448 | A | 5/1973 | Rusk et al. | |
| 4,080,767 | A | 3/1978 | Wilhelm | |
| 4,218,206 | A * | 8/1980 | Mullins | 425/253 |
| 4,389,036 | A | 6/1983 | Abou-Ezzeddine | |
| 5,062,610 | A | 11/1991 | Woolford et al. | |
| 5,217,630 | A | 6/1993 | Sayles | |
| 5,297,772 | A * | 3/1994 | Stefanick | 249/102 |
| 5,817,249 | A | 10/1998 | Audenaert et al. | |
| 5,879,603 | A | 3/1999 | Sievert | |
| 6,113,379 | A | 9/2000 | LaCroix et al. | |
| 6,138,983 | A | 10/2000 | Sievert | |
| 6,149,420 | A * | 11/2000 | Kim et al. | 425/192 R |
| 6,209,848 | B1 | 4/2001 | Bolles et al. | |
| 6,322,742 | B1 | 11/2001 | Bott | |
| 6,464,199 | B1 | 10/2002 | Johnson | |
| 6,571,521 | B1 | 6/2003 | Ameigh | |
| 2001/0007380 | A1 | 7/2001 | LaCroix et al. | |

FOREIGN PATENT DOCUMENTS

| | | | |
|---|---|---|---|
| DE | 9303683 | U1 | 6/1993 |

* cited by examiner

INSERT APPARATUS FOR A MOLD, METHOD OF MANUFACTURING A STRUCTURAL UNIT, METHOD OF RETROFITTING AN EXISTING MOLD AND A STRUCTURAL UNIT

CROSS REFERENCE TO RELATED APPLICATIONS

This application is a continuation-in-part of U.S. patent application Ser. No. 10/897,823, filed Jul. 23, 2004, which claims the benefit of priority from U.S. Patent Application No. 60/489,987, filed Jul. 25, 2003, which is incorporated herein by reference in its entirety.

BACKGROUND OF THE INVENTION

1. Field of the Invention

The present invention relates generally to apparatus and methods for manufacturing structural units, such as concrete blocks, brick, clay-based material, pavers, segmental retaining walls (SRWs), etc., from a mold and the structural units manufactured using these apparatus and methods and, in particular, to an insert apparatus for use in connection with a mold for manufacturing a structural unit, a method of manufacturing a structural unit having an engagement portion applied on a side or sides of the unit, a method of retrofitting an existing mold for manufacturing a structural unit having such engagement portions, and to a structural unit made using these apparatuses and methods.

2. Description of Related Art

In the field of manufacturing structural units, such as concrete, concrete blocks, pavers, bricks, SRWs and the like, a mold is required. In operation, a conveyor or similar transport mechanism moves a pallet or plate underneath the mold, which typically includes an open top, open bottom and multiple inner cavities for forming the concrete unit or structural unit. After the pallet or plate is moved into engagement with the underside of the mold, a fill drawer moves over the open top of the mold and places material, such as concrete or cement, into the inner cavity portion of the mold. Next, a machine head or plunger compresses the material, thereby providing additional compaction of the concrete material in the mold. Typically, the mold is vibrated while the concrete material is being placed or injected therein to provide better settling and uniformity.

After the concrete material is molded or shaped within the inner cavity of the mold, the pallet or plate moves down in a vertical manner away from the bottom of the mold and the compacted, consolidated and condensed concrete units also move down with the pallet. Typically, the concrete units are further cured, such as by natural curing, or by some other catalytic means. In this manner, a structural unit is manufactured.

Structural units, such as concrete blocks, cinder blocks and the like are used extensively in construction situations, as well as consumer applications. For example, a consumer may now wish to build his or her own retaining wall on their property. Therefore, a need has arisen for structural units that are more easily transported and manipulated in these fields and applications. In order to manufacture such specialized units, typically the mold must be modified to apply an engagement portion on a surface of the unit. There are different processes for accomplishing modified surfaces for structural units.

One drawback to applying a specific engagement portion or dimensioned projection or recess on a structural unit is the limitation of how a concrete unit is manufactured by the mold. As discussed above, the bottom of the plate moves to bound the mold and allow concrete material to be placed therein, and when this material is consolidated/compacted/condensed (CCC), the pallet or plate moves away from the bottom of the mold in a vertical direction. Therefore, any design that is placed upon a vertical surface of the concrete unit would be removed or otherwise distorted as the concrete unit drops down and slides through the mold via the pallet. While this does not pose an insurmountable problem when producing units with a roughened surface or similar pattern (since the design is not specific), systems and processes have been developed for applying these types of surfaces to a structural unit. For example, see U.S. Pat. No. 6,464,199 to Johnson; U.S. Pat. No. 6,209,848 to Bolles et al.; U.S. Pat. No. 6,138,983 to Sievert; U.S. Pat. No. 6,113,379 to LaCroix et al.; U.S. Pat. No. 5,217,630 to Sayles; and U.S. Pat. No. 5,879,603 to Sievert. See also Patent Application Publication No. U.S. 2001/0007380 to LaCroix et al. However, such processes and molds are deficient in that only a roughened or textured surface can be applied to the vertical face of the unit. Therefore, such systems and processes are not capable of producing a specified engagement portion or design, which could not be removed or distorted as the concrete unit is discharged from the mold.

Other processes have been developed for placing decorative surfaces, designs and indicia on a vertical face of the concrete unit. For example, see U.S. Pat. No. 5,817,249 to Forlini; U.S. Pat. No. 2,532,049 to Wittke; U.S. Pat. No. 1,693,693 to Dexter; and U.S. Pat. No. 1,635,093 to McPherson et al. However, these molds and processes are quite complicated. The mold must be specifically designed to create the design or indicia and typically a wall of the mold must be pressed and turned in towards the concrete material and then removed prior to dropping the unit from the mold. In addition, such intricate molds and machines are expensive and labor intensive, since multiple parts and walls and other mechanisms must be utilized to apply the indicia, remove the design portion and allow the block to be removed from the mold. Further, such molds and processes may not be well suited for the mass production of structural units.

There also remains a need for a structural unit that is easily manipulated and transported in construction, commercial and consumer situations. For example, it would be beneficial to provide some manner of grasping or otherwise holding a structural unit, which, as discussed above, is often very heavy. Therefore, while concrete or cinder blocks have a hollow core and may be grasped by these inner walls and moved about a construction site, the design of these prior art blocks makes them quite awkward to move and easily hold. Therefore, a need has arisen for a structural unit that a user can grasp and easily move around a particular site.

SUMMARY OF THE INVENTION

It is, therefore, an object of the present invention to provide an insert apparatus, a method of manufacturing a structural unit, a method of retrofitting an existing mold and a structural unit that overcomes the deficiencies of the prior art. It is another object of the present invention to provide an insert apparatus, structural units and methods of manufacturing a structural unit that has an engagement portion on one or more of the vertical surfaces of the unit. It is yet another object of the present invention to provide an insert apparatus, structural units and methods of manufacturing these structural units that change the general dimensions of the unit. It is a still further object of the present invention to provide an insert apparatus for use in connection with a mold for manufacturing a structural unit that is simple in its use and does not remove or otherwise distort the engagement portion when the unit is removed from the mold. It is another object of the present invention to provide a method of manufacturing a structural unit that includes an engagement portion impressed or recessed upon a vertical side or sides of the unit that is more efficient and capable of mass manufacturing of such units. It is a still further object of the present invention to provide a method of retrofitting an existing mold, such that a structural unit can be produced having an engagement portion, in the form of a projection or a recess, thereon. It is another object of the present invention to provide a structural unit that is easily grasped, manipulated or otherwise transportable on a site.

The present invention is directed to an insert apparatus for a mold for manufacturing at least one structural unit. The insert apparatus includes a carrier that operatively engaged a portion of the mold, and a face having at least one engagement design portion, which is in operative communication with and/or integral with the carrier. The at least one engagement design portion extends into or out of an inner cavity of the mold.

The present invention is also directed to a structural unit including at least one wall and an engagement portion extending at least partially within and/or projecting from the wall. The engagement portion is configured to engage with an object. The object may be a junction box, a utility box, a switchbox, a container, a pipe, a conduit, a handle, etc.

The present invention is further directed to a structural unit. The structural unit has at least one wall and an object that is either embedded within or integrally formed with the wall. The object is thereby engaged with the wall.

The present invention is further directed to a method of manufacturing a structural unit having an engagement portion disposed on one or more side surfaces of the unit. The method includes the steps of: (a) engaging a carrier within a mold, where the carrier is in operative communication with a face having an engagement design portion extending into or out of an inner cavity of the mold; (b) placing a material into the inner cavity of the mold, such that one or more sides of the inner cavity comprise the face; (c) at least one of consolidating, compacting and condensing the material, thereby forming the structural unit; and (d) removing the structural unit from the mold.

The present invention is also directed to a method of manufacturing a structural unit. The method includes the steps of: (a) engaging a carrier within at least a portion of the mold, the carrier in operative communication with an object; (b) placing material into the inner cavity of the mold, such that the material contacts at least a portion of the object; (c) at least one of compacting, consolidating and condensing the material, thereby forming a structural unit; and (d) removing the structural unit from the mold.

The present invention is also directed to a method of retrofitting an existing mold for manufacturing structural unit having an engagement portion applied on at least one side of the unit. The mold includes an inner cavity with one or more sides comprising the plate element removably attached to the side. The method includes the steps of: (a) detaching and removing at least one of the plate element and a structural unit cavity mold from the inner cavity of the mold; (b) providing an insert apparatus including a carrier in operative communication with at least one of an object and a face having at least one engagement design portion; and (c) engaging the carrier in place of the removed plate element or removed structural unit cavity mold, wherein the at least one of the object and the engagement design portion of the face portion extends into or out of the inner cavity of the mold.

The present invention is further directed to an improvement for use in connection with a mold for manufacturing a structural unit having an engagement portion applied on at least one side of the unit. The improvement comprises an insert. The insert is configured to operatively engage a portion of the mold, and the insert further comprises a carrier having a face portion with at least one engagement design portion extending into or out of the inner cavity of the mold.

The present invention is also directed to an insert for a mold for manufacturing at least one structural unit. The insert includes a carrier configured to operatively engage a portion of the mold. In addition, the carrier includes a face portion with at least one engagement design portion extending into or out of an inner cavity of the mold.

The present invention is further directed to a method of manufacturing a structural unit. The method includes the step of integrally forming an object with at least one wall of the structural unit. In this manner, the object is embedded within the wall of the structural unit.

The present invention is further directed to an insert apparatus for a mold for manufacturing at least one structural unit. The insert apparatus includes a carrier with a first carrier element and a second carrier element. The first carrier element and the second carrier element are configured to operatively engage at least a portion of the mold. In addition, at least one of the first carrier element and the second carrier element is in operative communication with an object, and the object extends into or out of the inner cavity of the mold.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
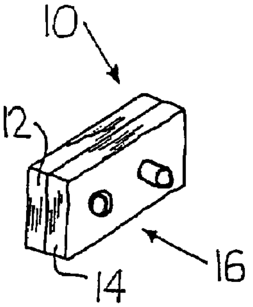
FIG. 1 is a perspective view of an insert apparatus according to the present invention.
Figure 2:
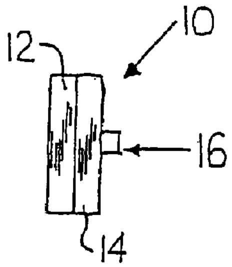
FIG. 2 is an edge view of the insert apparatus of FIG. 1.

For purposes of the description hereinafter, the terms "upper", "lower", "right", "left", "vertical", "horizontal", "top", "bottom", "lateral" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to an insert apparatus 10, as shown in various embodiments in FIGS. 1-5 and 7, a method of manufacturing a structural unit 100, a method of retrofitting an existing mold 110 for manufacturing such a structural unit 100 and a new and improved structural unit 100, as shown in various embodiments in FIGS. 10-13. As discussed in detail hereinafter, the insert apparatus 10 is particularly effective for use in connection with the mold 110, where the mold 110 is used for manufacturing at least one and typically multiple structural units 100, such as concrete units. The structural unit 100 may be a concrete block, a cinder block, a cement block, a brick, a clay-based unit, an aggregate unit, a paver, a segmental retaining wall unit, etc. In addition, the mold 110 includes an inner cavity 112, which is adapted to receive typically a semi-dry flowable mix and thereafter curable material, such as cement, concrete, aggregate or similar materials.

In one preferred and non-limiting embodiment, the insert apparatus 10 is for use in connection with the mold 110 for manufacturing one or more structural units 100. In particular, the insert apparatus 10 includes a carrier 12 that is adapted to operatively engage a portion or a part of the mold 110. Further, the insert apparatus 10 includes a face 14, and this face 14 includes one or more engagement design portions 16 thereon. In addition, the face 14 is in operative communication or engagement with the carrier 12. The engagement design portions 16 extend into or out of the inner cavity 112 of the mold 110. The engagement design portions 16 are configured to produce or create engagement portions 102 on a face 104 of the structural unit 100, as discussed in detail hereinafter.

Returning to the insert apparatus 10, and as best seen in FIGS. 1-3, 5 and 7, the face 14 is connected or attached to the carrier 12, and the engagement design portions 16 create an engagement portion 102 that is imprinted (that is impressed or recessed) upon the surface or face 104 of the structural unit 100, such that the engagement design portion 16 protrudes from or is recessed within the face 14. Further, the engagement design portion 16 creates these engagement portions 102 on typically a vertical surface of the structural unit 100. While the engagement portions 102, and engagement design portions 16, shown in the various figures of the present application constitute only some shapes or designs, any number of shapes, designs, projections, recesses, orifices or other desired faces can be obtained using the insert apparatus 10 and the methods discussed hereinafter. Dimensionally, the face 14, and in particular the engagement design portions 16, may produce protrusions, impressions, recesses, orifices or a combination of impressions and recesses on the face 104 of the structural unit 100.

In another embodiment, the carrier 12 and the face 14 may be constructed or manufactured as an integral piece. This may be particularly useful in an application where different engagement portions 102 are not required, and the same insert apparatus 10 can be used in connection with the same mold 110 throughout the process. In this embodiment, the carrier 12, face 14 and engagement design portion 16 are an integral unit.

Figure 3:
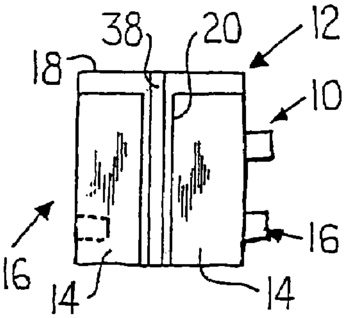
FIG. 3 is an edge view of a further embodiment of an insert apparatus according to the present invention.
Figure 4:
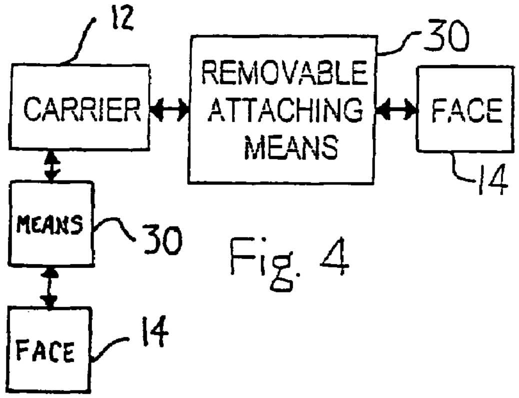
FIG. 4 is a schematic view of an insert apparatus according to the present invention.

In a further embodiment, and as illustrated in FIG. 3, the face 14 may be removably attachable to the carrier 12, and for example, the carrier 12 may be in the form of a substantially T-shaped structure. Accordingly, and in this embodiment, the carrier 12 would have a horizontal wall 18, a vertical wall 20, a first side surface 22, a second side surface 24, a first edge surface 26 and a second edge surface 28. Therefore, multiple faces 14 can be used in connection with such a carrier 12. A first face 14 could be removably attached to the first side surface 22 of the vertical wall 20, and a second face 14 could be removably attached to the second side surface 24 of the vertical wall 20. In this manner, while multiple structural units 100 are being formed, each structural unit 100 can have a different engagement portion 102 applied thereto.

As discussed above, the face 14 may be removably attachable to the carrier 12, where a removable attaching means 30 facilitates the releasably attachable functionality of either one or both of the face surfaces 14 with respect the carrier 12. In particular, the face 14 would be removably attachable to either the first side surface 22 and/or the second side surface 24. Specifically, it is the removable attaching means 30 that allows the face 14 to engage the carrier 12 in a removable and non-permanent manner. Any removable attaching means 30 is envisioned, such as an attachment device, an adhesive compound, interacting magnetic elements, a flange and groove arrangement, a male/female plug arrangement, a vacuum mechanism, an elongated member in operative communication with the carrier 12 and a face 14, a clamp, etc.

Figure 7:
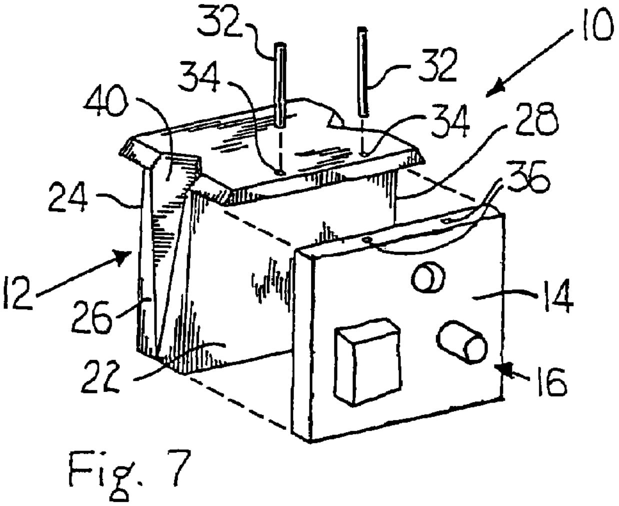
FIG. 7 is a perspective view and exploded view of a further embodiment of an insert apparatus according to the present invention.

In one preferred and non-limiting embodiment, one or more pins 32 could be provided as the removable attaching means 30. These pins 32 could be insertable through corresponding pin orifices 34 on the carrier 12, and further aligned pin orifices 36 on the face 14. As shown in FIG. 7, the face 14 will be placed against the first side surface 22 and/or the second side surface 24, and the pins 32 would be inserted through the pin orifices 34 on the carrier 12 and further into the pin orifices 36 on the face 14. These pins 32 would allow the face 14 to be attached to the carrier 12 throughout the process, yet allow the pins 32 to be removed, thereby releasing the face 14 from the carrier 12. Thereafter, a different face 14 could be used in connection with the same carrier 12.

Figure 8:
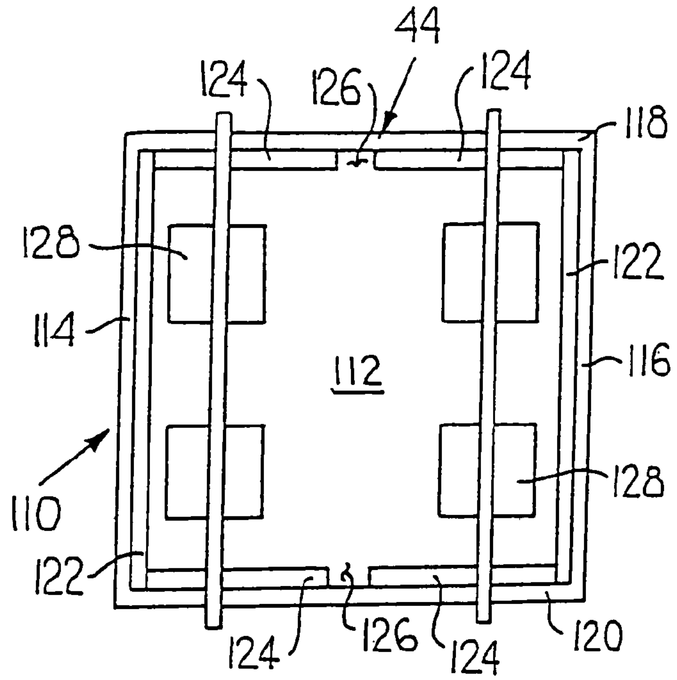
Fig. 8 (Prior Art)
FIG. 8 is a top view of a mold according to the prior art.

A mold 110 according to the prior art is illustrated in FIG. 8. This mold is a typical box-like structure, including a first side wall 114, a second side wall 116, a first end wall 118 and a second end wall 120. It is the first side wall 114, the second side wall 116, and first end wall 118 and the second end wall 120 that create the box that is the mold 110. However, the concrete material or similar material is not simply placed into the mold 110. Instead, with respect to the inner surfaces of the walls (114, 116, 118, 120), a side plate element 122 is secured to an inner surface of the first side wall 114 and the second side wall 116. Similarly, a plurality of end plate elements 124 are arranged on the inner surfaces of the first end wall 118 and the second end wall 120.

It should be noted that this arrangement is for constructing two structural units 100, and any number of side plate elements 122 and end plate elements 124, when used in connection with variously sized and shaped molds 110, will provide for the manufacture of one or multiple variously sized and shaped structural units 100. In the present embodiment, the end plates 124 are secured to the first end wall 118 and the second end wall 120 in such a way that each end plate element 124 includes a first end that abuts a side plate element 122 and a free end, which forms a groove 126. In addition, the mold 110 may include one or more structural unit cavity forms 128, which assists in forming cavities in the structural unit 100 after the material is injected into the inner cavity 112 of the mold 110.

Returning to the insert apparatus 10, the carrier 12 may include a projection 38 or a groove 40 on a surface of the carrier 12. This projection 38 and/or groove 40 is adapted to mate with a complimentary projection 42 or groove 44 located on a surface within the inner cavity 112 of the mold 110. For example, as seen in FIG. 3, a projection 38 (acting as a flange) may be disposed on the first edge surface 26 and/or the second edge surface 28 of the carrier 12. The projection 38 is configured to mate with the groove 44, which, in this embodiment, is identical to the groove 126 discussed above in connection with the mold 110. Similarly, as shown in FIGS. 5-7, the groove 40 may be located on the carrier 12, and specifically, the first edge surface 26 and/or the second edge surface 28, and this groove 40 is configured to mate with a projection 42 in the inner cavity 112 of the mold 110.

Figure 5:
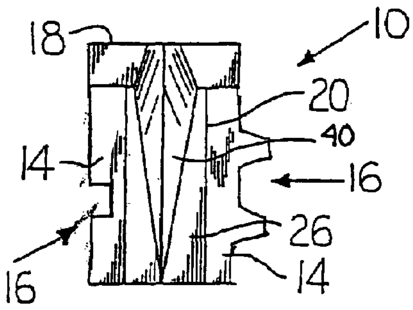
FIG. 5 is an edge view of a further embodiment of an insert apparatus according to the present invention.
Figure 6:
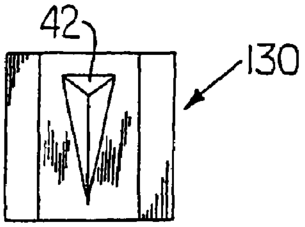
FIG. 6 is a front view of a modified plate element for use in connection with a mold according to the present invention.

In one preferred and non-limiting embodiment, and as illustrated in FIGS. 5-7, the groove 40 on the carrier 12 is in the form of an upside-down semi-pyramidal groove, and the projection 42 of the mold 110 is in the form of a complimentary upside-down semi-pyramidal projection 42. As seen in FIG. 6, a modified end plate 130 may be provided, and this modified end plate 130 would include the projection 42, which interacts with and frictionally engages the groove 40 on the first edge surface 26 and/or the second edge surface 28 of the carrier 12. In addition, any number of shapes and sizes of projections 38 and grooves 40 on the carrier 12, and complimentary projections 42 and grooves 44 on the mold 110 are envisioned. Further, any manner of attaching the insert apparatus 10 within the mold 110 is also envisioned.

The carrier 12 may be manufactured from a variety of materials, for example, the carrier 12 may be manufactured from a thermoplastic material, a synthetic material, a plastic, a polymer, wood, a rigid material, etc. Similarly, the face 14 may be manufactured from a variety of materials. For example, the face 14 may be manufactured from a thermoplastic material, a synthetic material, a plastic, a polymer, wood, a rigid material, a flexible material, a foam, a closed-cell foam, etc. In one preferred and non-limiting embodiment, the face 14 is manufactured from a closed-cell polymeric material.

It is envisioned that different engagement design portions 16 are disposed upon the face surface of a plurality of faces 14, and each engagement design portion 16 produces a different engagement portion 102 on the structural unit 100. Accordingly, various objects 150 can be engaged with or mated with a specifically-designed engagement portion 102 in the structural unit 100, as discussed in more detail hereinafter. These different engagement design portions 16 may be disposed upon the faces 14 by an automated process. The face substrate could be cut into a set of predetermined sized and shaped faces 14 for use in connection with the carrier 12.

Figure 9:
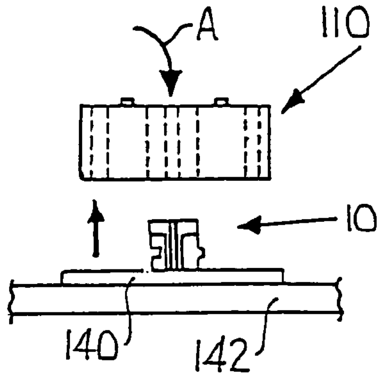
FIG. 9 is a schematic view of the insertion of an insert apparatus according to the present invention in a mold.

In operation, and according to the present method of manufacturing a structural unit 100, the carrier 12 is engaged within the mold 110. Further, the carrier 12 already includes or is in operative engagement with one or more faces 14. As seen in FIG. 9 and as occurs in a typical process, a pallet 140 is placed on a conveyor 142, and the conveyor 142 transports the pallet 140 to a position directly underneath the mold 110. However, according to the present invention, the insert apparatus 10 is specifically positioned with respect to the mold 110, such that when the pallet 140 is moved up toward the mold 110, thereby forming a bottom surface of the mold 110, the insert apparatus 10 is appropriately engaged within the mold 110. When the insert apparatus 10 is constructed as illustrated in FIG. 3, where the carrier 12 includes projections 38, the insert apparatus 10 is positioned such that these projections 38 engage the grooves 126 of the mold 110 when the pallet 140 is engaged with the mold 110. After the pallet 140 is engaged, and the insert apparatus 10 is in place, the concrete, cement or similar material is placed into the inner cavity 112 of the mold 110, as schematically illustrated by arrow A in FIG. 9.

It is envisioned that, according to the prior art and typical processes, a block machine (not shown) could be used to compact and assist in forming a structural unit 110 after the concrete or similar material has been placed into the inner cavity 112 of the mold 110. Similarly, a vibration apparatus may also be used to help in settling, consolidating, compacting and condensing the material, as is known in the art. After the insert apparatus 10 is placed in the mold 110, the process according to the prior art proceeds accordingly. After the concrete unit is consolidated, compacted and condensed, the pallet 140 is vertically dropped down, carrying with it the newly-formed structural unit 100, having engagement portions 102 disposed thereon. It is envisioned, at this point, that the structural unit 100 will be dropped down together with the insert apparatus 10, which is still adhered to or attached to the structural unit or units 100. It is envisioned that the carrier 12 may be removed mechanically (or by hand) from the insert apparatus 10 at this point in the process or at some later point. Further, the face 14 may be disengaged from the carrier 12 and a new face 14 replaced thereon. In addition, the structural unit 100 may be further cured before subsequent use and the face 14 may be removed at this point.

It is often necessary for the insert apparatus 10 to be removably engaged with a mold 110 for the effective creation of the structural unit 100. Therefore, it is also envisioned that one or multiple modified end plates 130, as discussed above, can be introduced at any one or more locations within the mold 110. Due to the shape of the projection 42 and the modified end plate 130, and the complimentary groove 40 on the carrier 12 (see FIGS. 5 and 6), the upside-down semi-pyramidal shape maximizes the centering capability as the pallet 140 lifts the insert apparatus 10 up into the mold 110. Specifically, due to the shape of the projection 42 on the modified end plate 130, the insert apparatus 10 would have some room for error in the initial positioning, and this error would be overcome and the insert apparatus 10 engaged within the mold 110 upon complete engagement. Any number of shapes and projections to achieve such centering and alignment capabilities are envisioned. In one preferred embodiment, the face 14 and the engagement design portion 16 are manufactured from a foam material. The foam material would be particularly suitable to this process, since such a material would not bind with the concrete or similar material as it cures. However, any material of construction of the insert apparatus 10 is envisioned. Further, while the mold 110 of FIG. 8 has been shown and described, any number of molds 110 can be used. In addition, the insert apparatus 10 may be top loaded or bottom loaded (as described) according to the user and the arrangement of the equipment in the process.

In another aspect of the present invention, a presently existing mold 110 may also be retrofitted for forming the desired structural units 100. For example, the insert apparatus 10, the carrier 12 and/or the face 14 can take the place of any one or more of the side plate elements 122 and the end plate elements 124. Further, any vertical surface that is removable and replaceable may be replaced with an appropriately sized and shaped insert apparatus 10, carrier 12 and/or face 14 for forming an engagement portion 102 on any one or more of the vertical faces of the structural unit 100. Due to the easy engagement and appropriate size of the insert apparatus 10, the present invention is particularly adaptable to suit any of a variety of design considerations and options. This provides the user with the maximum amount of flexibility in choosing the designs to satisfy a consumer's needs. Therefore, the present invention is useful in both mass production of structural units 100, as well as special order units.

As discussed above, the insert apparatus 10 may be formed as an integral insert including the carrier 12 and the face 14. In this preferred and non-limiting embodiment, the carrier 12 would engage at least a portion of the mold 110, and the carrier 12 would include the face 14 as a face portion or integral portion of the carrier 12. As discussed above, the face 14 would include one or more engagement design portions 16 extending into or out of the inner cavity 112 of the mold 110. Accordingly, this integrated carrier 12 and face 14 (with engagement design portions 16) could be engaged with and fit into a pre-existing mold 110 for use in constructing the structural unit 100, as discussed in detail hereinafter.

Figure 10:
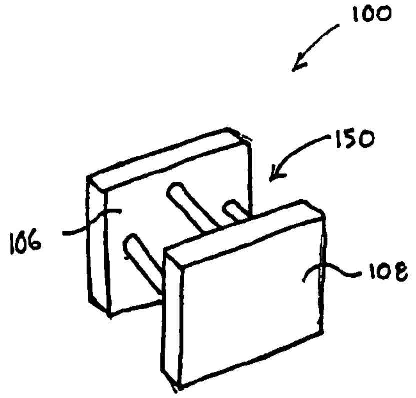
FIG. 10 is a perspective view of a structural unit according to the present invention.
Figure 11:
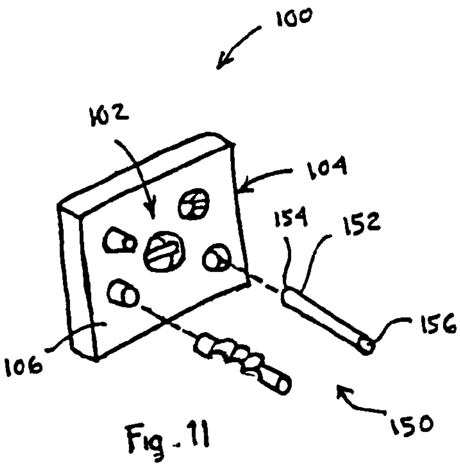
FIG. 11 is an exploded perspective view of a further embodiment of a structural unit according to the present invention during assembly.
Figure 12:
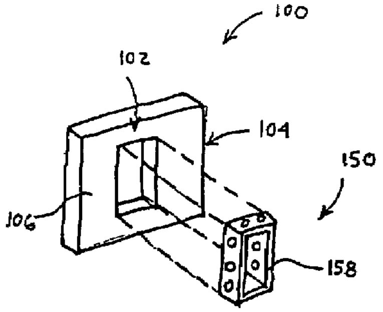
FIG. 12 is an exploded perspective view of a further embodiment of a structural unit according to the present invention during assembly.
Figure 13:
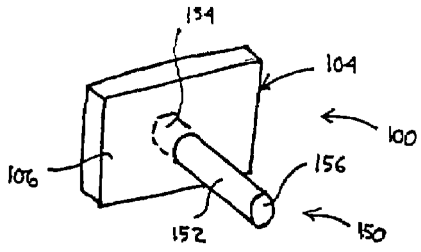
FIG. 13 is a schematic view of a still further embodiment of a structural unit according to the present invention.

As illustrated in various embodiments in FIGS. 10-13, the present invention is also directed to a novel and improved structural unit 100. In one embodiment, the structural unit includes a wall 106, and an engagement portion 102 extends at least partially within and/or projects from this wall 106. It is this engagement portion 102 that is configured to engage with an object 150. Various objects 150 can be engaged with the wall 106. For example, as illustrated in FIGS. 10, 11 and 13, the object may be a pipe, a conduit, a handle or some other object 150 that allows a user to grasp the object 150 and lift the structural unit 100. Additionally, the object may be a junction box, a utility box, a switchbox or similar insertable object 150 that can be inserted within and engaged with the engagement portion 102 of the structural unit 100. Still further, the object may be a tube, shaped wood, a fixture, a reinforcement element, wire, a guide, insulation, sheet, a wall, a foam object, an object that modifies the physical properties of the wall, etc.

Therefore, in one embodiment, the engagement portion 102 extends at least partially within or even through the wall 106, and engagement portion 102 is sized and shaped to permit a junction box, a utility box, a switchbox, etc. to be at least partially positioned therein. In another embodiment, the engagement portion 102 extends at least partially within or through the wall 106, and the engagement portion 102 is sized and shaped to permit a pipe, a conduit, a handle, etc. to be at least partially positioned therein. In a still further embodiment, the engagement portion 102 projects from the wall 106, and the engagement portion 102 is sized and shaped to permit a pipe, a conduit, a handle, etc. to be at least partially positioned thereon.

In another preferred and non-limiting embodiment, the structural unit 100 includes a first wall 106 and a second wall 108 that is mutually opposing the first wall 106. Each wall (106, 108) includes at least one engagement portion 102 disposed thereon. In this embodiment, the object 150 is in the form of a pipe, a conduit and/or a handle that is in operational communication with the engagement portion 102 of the first wall 106 and the second wall 108. See FIG. 10.

In another embodiment, the engagement portions 102 of the first wall 106 and the second wall 108 extend at least partially within each respective wall (106, 108). A conduit section 152, having a conduit first end 154 and a conduit second end 156, is engaged with each engagement portion 102. In this manner, the first end 154 of the conduit section 152 is positioned at least partially within the engagement portion 102 of the first wall 106, and the second end 156 of the conduit section 152 is positioned at least partially within the engagement portion 102 of the second wall 108. In this arrangement, an object 150 is inserted within the engagement portion 102. It is also envisioned that the engagement portion 102, whether it projects from or extends within the wall 106, could be tapered for easier frictional engagement with the object 150. See FIG. 11.

In another embodiment, the engagement portions 102 of the first wall 106 and the second wall 108 project from each respective wall (106, 108). The conduit section 152 is positioned, such that the first end 154 of the conduit section 152 is positionned at least partially on the engagement portion 102 of the first wall 106, and the second end 156 of the conduit section 152 is positioned at least partially on the engagement portion 102 of the second wall 108. Both this and the previous embodiment are illustrated in connection with a single wall surface in FIG. 11. FIG. 12 illustrates a structural unit 100 where the object 150 is a switchbox 158. The engagement portion 102 of the structural unit 100 in this embodiment would either be a recess or extend through the structural unit 100, such that the switchbox 158 could be inserted and engaged with the engagement portion 102.

In a further embodiment of the present invention, a structural unit 100 is provided that has the above-discussed wall 106. However, in this embodiment, the object 150 is directly embedded within or integrally formed with the wall 106 during the manufacturing process. In this manner, the object 150 projects from the wall or is otherwise embedded within or formed with the wall 106 at a specified engagement area. Accordingly, this embodiment of the present invention would not require a pre-existing or pre-manufactured engagement portion 102 for attachment of the object 150 with or within. However, it may be preferable to form the engagement portions 102 on the wall 106 so that the object 150 could be attached to one or both walls (106, 108) and subsequently removed after the structural unit 100 is transported to a desired location on the site, or in the case of a switchbox 158, the switchbox 158 could be removed for repair or replacement purposes. Therefore, only one object 150, such as a handle or conduit section 152, could be used multiple times in connection with multiple different structural units 100. Still further, the object 150 could be inserted through multiple structural units 100, such as by inserting a conduit section 152 through multiple engagement portions 102 that extend through multiple structural units 100. This one conduit section 152 could be used to lift or transport these multiple structural units 100.

Figure 14:
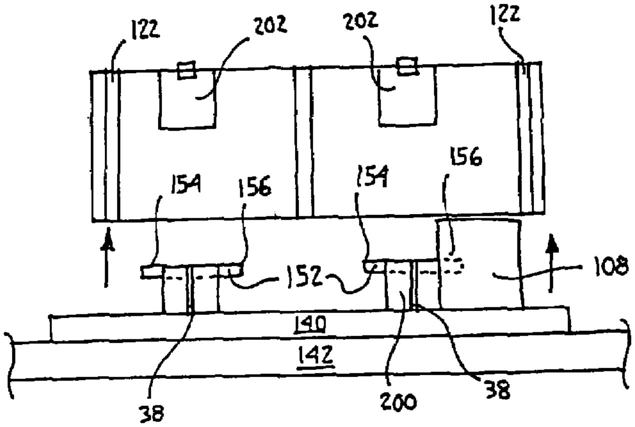
FIG. 14 is a schematic view of still further embodiments of an insert apparatus according to the present invention.

As discussed above, the object 150 may be directly embedded within or integrally formed with the wall 106 during the manufacturing process. In addition, the object 150 may be directly embedded within or integrally formed with the wall 108 during the manufacturing process or prior to the manufacturing process. For example, either the first wall 106 or the second wall 108 does not necessarily have to be manufactured from a concrete material. For example, either the first wall 106 and/or the second wall 108 may be manufactured from the above-discussed materials, but also may be manufactured from a thermoplastic material, a synthetic material, plastic, a polymer, wood, a rigid material, metal, a semi-metal, etc. For example, the second wall 108 may be manufactured from a paneling or wood material. In this embodiment, the object 150 would be pre-embedded into the wall 108 prior to manufacturing the concrete portion or wall 106. Therefore, as seen in FIG. 14, the wall 108 would already have the object 150 embedded or attached to the wall 108, such that the wall 108 would be pre-manufactured and inserted into the mold 110 along with the insert apparatus 10. Accordingly, the insert apparatus 10 may also include some mechanism for engaging with the second wall 108 during the transportation and engagement processes. Alternatively, the wall 108 may be held in the proper position through its attachment with the object 150, which would be in operative communication with the carrier 12.

As discussed above, the object 150 may be any useful object 150 that could be associated with or function with the structural unit 100. While a handle, a conduit section 152, and a switchbox 158 have been illustrated, any manner and type of object 150 could be used in place of these described objects 150. For example, the engagement portion 102 of the structural unit 100 may be in the form of a loop or other projection or recess that allows a rope or line to be tied to or engaged with. See FIG. 11.

In a further embodiment, and as discussed above, the structural unit 100 may be manufactured with an object 150, such as a conduit 152 or a handle embedded within or integrally formed with a wall 106. This may be achieved through a variety of methods of manufacturing as discussed above. However, in one preferred and non-limiting embodiment, and as illustrated in FIG. 14, the carrier 12 may include a first carrier element 200 and a second carrier element 202. The first carrier element 200 would be in operative communication with or otherwise releasably engage the object 150, such as the conduit 152. The first end 154 of the conduit section 152, and the second end 156 of the conduit section 152, would extend away from the first carrier element 200. A second carrier element 202 would be pre-engaged with the mold 110. In one preferred embodiment, the second carrier element 202 would be engaged in place of the structural unit cavity form 128. Therefore, in operation, the structural unit cavity form 128 (as illustrated in FIG. 8) would be removed and, in place of the structural unit cavity form 128, the second carrier element 202 would be engaged with or otherwise positioned with respect to the mold 110, such that the second carrier element 202 would extend into the inner cavity 112 of the mold 110.

Both the first carrier element 200 and the second carrier element 202 would be manufactured in a complimentary shape, such that when the first carrier element 200 and the second carrier element 202 abut, concrete material would be effectively prevented from flowing in or around the first carrier element 200 and the second carrier element 202. Any complimentary and abuttable geometric shape is envisioned, and the shape would be chosen in order to effectively place the object 150 in an appropriate location in the resulting structural unit 100. It is also envisioned that the first carrier element 200 and the second carrier element 202 would include the appropriate projection 38 or groove 40 located on a surface thereof, such that the projection 38 and/or the groove 40 would be capable of mating with a complimentary projection or groove located on a surface within the inner cavity 112 of the mold 110. Any of the inner surfaces of the mold 110 could be appropriately modified or arranged such that the first carrier element 200 and/or the second carrier element 202 could releasably engage the mold 110.

Figure 15:
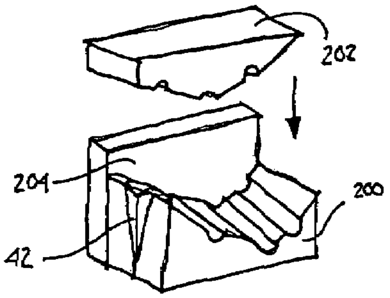
FIG. 15 is an exploded perspective view of a further embodiment of an insert apparatus according to the present invention.

One example of such a multi-carrier embodiment is illustrated in FIG. 15. In particular, the first carrier element 200 and the second carrier element 202 are complimentary, such that a conduit 152 can be placed in a recess or a location on the first carrier element 200, with a second end 156 of the conduit 152 extending therefrom. Similarly, the second carrier element 202, in the form of a cap or cover, is placed down over the multiple conduits 152 located on the first carrier element 200. In this embodiment, a third carrier element 204 is utilized. In particular, the third carrier element 204 is positioned against the first carrier element 200 and second carrier element 202 for forming a wall 106 with the three conduit 152 sections embedded therein. However, due to the use of the third carrier element 204, a second wall 108 would not be formed. This arrangement merely demonstrates another and further use of the present invention in the creation of variable structural units 100.

Figure 16:
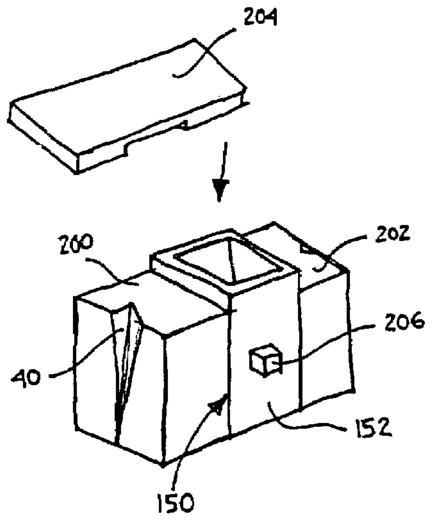
FIG. 16 is an exploded perspective view of a still further embodiment of an insert apparatus according to the present invention.

A similar multi-carrier embodiment is also illustrated in FIG. 16. In this embodiment, the first carrier element 200 and the second carrier element 202 are disposed on either side of a conduit 152, specifically on a respective outer face of the conduit 152. In addition, in this embodiment, the third carrier element 204 is a cap that fits over the first carrier element 200, the second carrier element 202 and the first end 154 of the conduit 152. While not necessary, the object 150 (or conduit 152) may include an object projection 206 that can be embedded in a respective wall 106, 108. This allows for secure attachment of the object 150 to the walls 106, 108 of the structural unit 100.

Figure 17:
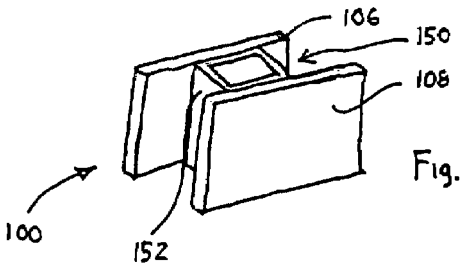
FIG. 17 is a perspective view of a structural unit resulting from the use of the insert apparatus of FIG. 16.

The structural unit 100 that results from the use of the first carrier element 200, the second carrier element 202 and the third carrier element 204 of the embodiment of FIG. 16, is illustrated in FIG. 17. As discussed above in detail, multiple structural units 100 can be placed together to achieve and create a larger wall or surface having new and specialized characteristics and properties. For example, it is envisioned that the conduit 152 of the embodiment illustrated in FIG. 17 is embedded within only a single wall 106, such that the object 150 protrudes from the wall 106. When multiple walls 106 are stacked on top of each other, a larger conduit 152 is created, and can be used for many different applications, such as a downspout or other channel. Further, the object 150 can be manufactured from a variety of materials that may, for example, allow for the addition of other material as the second wall 108. For example, the object 150 may be a conduit 152 or other object 150 that allows for plywood or drywall to be directly affixed to the object 150. Many different variations and arrangements of the walls 106, 108 and the attached or embedded objects 150 are envisioned.

In operation, and in manufacturing the structural unit 100 of this embodiment, the first carrier element 200 would be engaged with or otherwise placed in operative communication with the object 150, such as the conduit section 152. The first carrier element 200 would be placed on the pallet 140, and the pallet 140 placed on the conveyor 142. The conveyor 142 would transport the pallet 140 to a position directly underneath the mold 110, and the first carrier element 200 would be moved up and within the inner cavity 112 of the mold 110. Since the second carrier element 202 would be pre-positioned within the inner cavity 112 of the mold 110, the first carrier element 200 would be moved into an abutting relationship therewith. As discussed above, one or more of the ends of the object 150 would be extending into the inner cavity 112 of the mold 110 once the first carrier element 200 and the abutting second carrier element 202 are in position in the inner cavity 112 of the mold 110.

Next, material is placed into the inner cavity 112 of the mold 110. Since the first carrier element 200 and the second carrier element 202 occupy a specific volume of the inner cavity 112 of the mold 110, the material could not flow therein. However, since the end, such as the first end 154 and/or the second end 156 of the conduit section 152 are exposed to the material, the material would flow around and embed the object 150. When the appropriate consolidation, compacting and condensing has taken place, the first carrier element 200 is dropped back down through the mold 110 and now includes a first wall 106 and a second wall 108 with the object 150 embedded and integrally formed with each wall. The first carrier element 200 could then be removed and the resulting structural unit 100 would include an object 150 embedded within one or more walls of the structural unit 100. Of course, as discussed above, if the first wall 106 and/or the second wall 108 is not to be manufactured from a concrete material, the object 150 may be pre-embedded (or embedded thereafter) within the wall (106, 108) prior to or after insertion into the mold 110.

In this manner, an insert apparatus 10 is provided for forming an engagement portion 102 upon one or more vertical faces 14 of the structural unit 100, typically a concrete or cement unit. In addition, the present invention provides a method of manufacturing a structural unit 100 having an engagement portion 102 on the structural unit 100, and this process is adaptable, flexible and more simple in operation than the prior art processes. Still further, the present invention provides a method of retrofitting an existing mold 110 for manufacturing such structural units 100. During the typical bottom loading and unloading process, the engagement portion 102 formed in the structural unit 100 would not be removed or distorted in any way, since the insert apparatus 10 is ejected along with the structure 100. Further, the insert apparatus 10 does not use complicated machinery and extensive labor to successfully employ. Also provided is a novel and unique structural unit 100 that includes an engagement portion 102 that otherwise allows an object 150 to be positioned thereon or engaged therewith. Further, a structural unit 100 is also provided that allows this object 150 to be embedded within the wall (106, 108) of the structural unit 100. In this manner, the object 150 could be used to transport the structural unit 100 around the site. Alternatively, the object 150 could be embedded within the structural unit 100 for construction purposes, such as when the object 150 is a switchbox 158.

This invention has been described with reference to the preferred embodiments. Obvious modifications and alterations will occur to others upon reading and understanding the preceding detailed description. It is intended that the invention be construed as including all such modification and alterations.

The invention claimed is:

1. An insert apparatus for a mold for manufacturing at least one structural unit, the insert apparatus comprising:

a carrier configured to operatively engage at least a portion of the mold and removable from the mold along with the at least one structural unit, the carrier is in a form of a substantially T-shaped structure having a substantially horizontal wall and a substantially vertical wall with a first side surface, a second side surface, a first edge surface and a second edge surface;

a first face having at least one engagement design portion and in at least one of operative communication and integral with the first side surface of the carrier; and a second face having at least one different engagement design portion and in at least one of in operative communication and integral with the second side surface of the carrier;

wherein the at least one engagement design portion and the at least one different engagement design portion extend into or out of an inner cavity of the mold.

2. The insert apparatus of claim 1, wherein the first face and the second face are removably attached to the first side surface and the second side surface, respectively, by a removable attaching means.

3. The insert apparatus of claim 2, wherein the removable attaching means is at least one of an attachment device, an adhesive compound, interacting magnetic elements, a flange and groove arrangement, a male/female plug arrangement, a vacuum mechanism and an elongated member in operative communication with the carrier and the face.

4. The insert apparatus of claim 1, wherein the carrier includes at least one of a projection and a groove positioned on a surface thereof and configured to mate with a complimentary groove and projection located on an inner surface of the mold.

5. The insert apparatus of claim 4, wherein the projection and groove of at least one of the carrier and the inner surface of the mold is in the form of an upside-down semi-pyramid.

6. The insert apparatus of claim 4, wherein the groove of the carrier is in the form of an upside-down semi-pyramidal groove, and the projection of the inner surface of the mold is in the form of a complimentary upside-down semi-pyramidal projection.

7. The insert apparatus of claim 1, wherein the engagement design portions are configured to form an engagement portion on the structural unit for engaging with an object.

8. The insert apparatus of claim 7, wherein the object is at least one of a junction box, a utility box, a switchbox, a container, a pipe, a conduit, a handle, a tube, shaped wood, a fixture, a reinforcement element, wire, a guide, insulation, sheet, a wall, a foam object and an object that modifies the physical properties of the wall.

9. An insert apparatus for a mold for manufacturing at least one structural unit, the insert apparatus comprising a carrier including a plurality of carrier elements, wherein the plurality of carrier elements is configured to operatively engage at least a portion of the mold and removable from the mold along with the structural unit, and wherein at least one of the plurality of carrier elements is in operative communication with an object, the object extending into or out of an inner cavity of the mold, and further wherein at least one of the plurality of carrier elements includes at least one of a projection and a groove positioned on a surface thereof and configured to mate with a complimentary groove and projection located on a surface of the mold.

10. The insert apparatus of claim 9, wherein the object is at least one of a junction box, a utility box, a switchbox, a container, a pipe, a conduit, a handle, a tube, shaped wood, a fixture, a reinforcement element, wire, a guide, insulation, sheet, a wall, a foam object and an object that modifies the physical properties of the wall.

* * * * *

UNITED STATES PATENT AND TRADEMARK OFFICE

CERTIFICATE OF CORRECTION

PATENT NO. : 7,575,217 B2
APPLICATION NO. : 11/053034
DATED : August 18, 2009
INVENTOR(S) : Jucha et al.

It is certified that error appears in the above-identified patent and that said Letters Patent is hereby corrected as shown below:

Title Page, item, Add the following:

-- Related U.S. Application Data

(60) Continuation-in-part of U.S. Patent Application No. 10/897,823, filed on July 23, 2004, which claims the benefit of priority from U.S. Patent Application No. 60/489,987, filed July 25, 2003. --

Signed and Sealed this

Twenty-ninth Day of December, 2009

David J. Kappos
*Director of the United States Patent and Trademark Office*